(12) United States Patent
Damkjær et al.

(10) Patent No.: US 6,758,329 B1
(45) Date of Patent: Jul. 6, 2004

(54) WIDE CHAIN LINK CONVEYOR STRUCTURE

(75) Inventors: John Haue Damkjær, Vejle (DK); Poul Erik Damkjær, Vejle (DK)

(73) Assignee: uni-chains A/S, Vejle (DK)

( * ) Notice: Subject to any disclaimer, the term of this patent is extended or adjusted under 35 U.S.C. 154(b) by 0 days.

(21) Appl. No.: 10/446,124

(22) Filed: May 28, 2003

(30) Foreign Application Priority Data

Feb. 10, 2003 (DK) .......................................... 2003 00182

(51) Int. Cl.⁷ .............................................. B65G 17/38
(52) U.S. Cl. ..................................... 198/853; 198/850
(58) Field of Search ................................. 198/850, 853

(56) References Cited

U.S. PATENT DOCUMENTS

| | | | | |
|---|---|---|---|---|
| 4,729,469 A | * | 3/1988 | Lapeyre et al. | 198/853 |
| 5,121,831 A | * | 6/1992 | Fesler | 198/853 |
| 5,303,818 A | * | 4/1994 | Gruettner et al. | 198/850 |
| 5,469,956 A | * | 11/1995 | Greve et al. | 198/853 |
| 6,305,530 B1 | * | 10/2001 | Guldenfels | 198/853 |

* cited by examiner

*Primary Examiner*—James R. Bidwell
(74) *Attorney, Agent, or Firm*—James Creighton Wray; Meera P. Narasimhan

(57) ABSTRACT

The invention provided a conveyor belt, which is special in that the belt in a direction perpendicular to the traveling direction of the belt is made from one single chain link, and that the transport top surface comprises a wide main portion and the top part of the eye projections which are flush with the main portion, such that the belt surface is substantially without apertures and/or openings and further that the hinge-like assembly arrangement is fully accessible only from the underside of the belt.

By this inventive chain link is achieved that the narrow gaps between each assembled chain link in the prior art is not present such that from a hygienic point of view it becomes much easier to clean the entire conveyor belt satisfactory in that for each chain link, which usually constitutes 40–60 mm of the total length of the conveyor belt, which altogether, especially for deboning lines, might be 300–400 meter long, no gaps are present. This in turn gives the added security that the multitude of gaps, sometimes more than 30,000 gaps, does not have to be cleaned. This gives rise to a substantial increase in the confidence that a satisfactory cleaning process complying with the high hygienic standards in the meat producing business can be achieved.

29 Claims, 2 Drawing Sheets

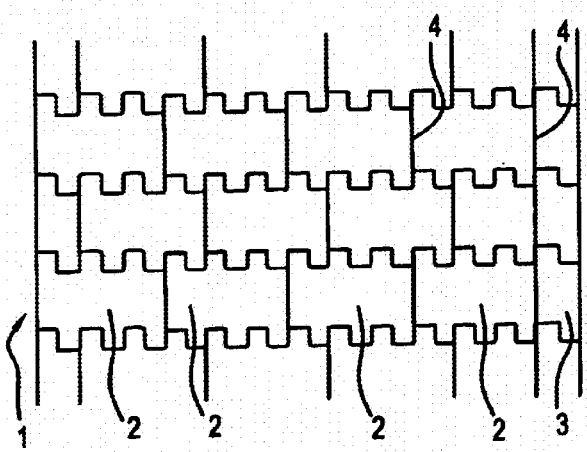
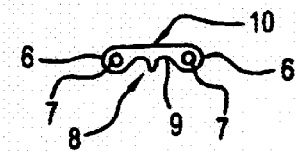
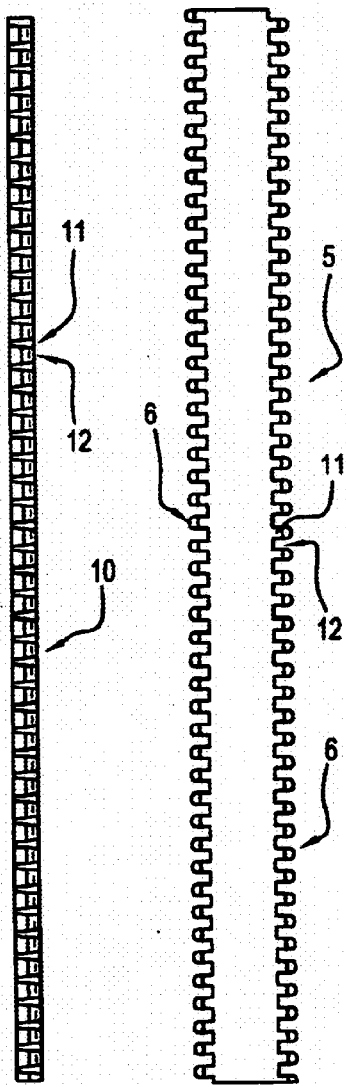
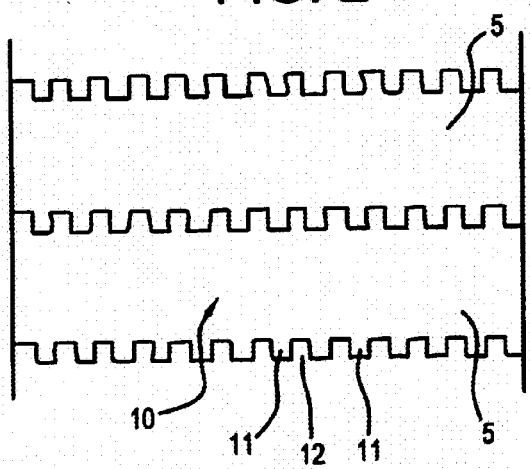

WIDE CHAIN LINK CONVEYOR STRUCTURE

This application claims the benefit of Danish Application No. PA 2003 00182 filed Feb. 10, 2003.

TECHNICAL FIELD

The present invention relates to a conveyor belt especially for use in the fresh food production industry as well as a chain link for constructing such a conveyor belt.

BACKGROUND OF THE INVENTION

In slaughterhouses and abattoirs the butchering of animals is highly industrialized and during the process the animals or part of the animals are transported for example from storage to different stages where the actual cutting of the animals into the desired sections/pieces takes place. During this process, the parts of the animals or lumps of meat are transported on conveyor belts.

These conveyor belts are often 60 cm wide or more so that the entire carcass of an animal or parts thereof will fit onto the conveyor belt. At the same time it is desirable to butcher the animals directly on the conveyor belt as they pass the workstation. For this purpose specialized conveyor belts have been developed where the surface is relatively flush and the independent chain links are assembled in such a manner that the gaps and slices between each link are minimized.

Furthermore, in order to reduce the costs of manufacturing the chain links which make up a conveyor belt, the chain links are often made in an size where, in order to assemble a conveyor belt that is 60 cm or more wide, a number of chain links in the width direction of the conveyor belt is needed. The conveyor belt is hereby assembled by a number of chain links, for example 7 or 8, making up the entire width of the belt and the adjacent row of chain links is assembled in a staggered manner such that a brick laying pattern is constructed.

The chain links are usually assembled by providing protruding eye parts in both the front and rear end of each chain link, such that an eye part alternates with a recess substantially corresponding in size to the width of the eye part. Furthermore, the eye parts are offset on the rear side in relation to the eye parts on the front side of each chain link.

Furthermore, approximately in the middle of each eye part in a transverse direction in relation to the traveling direction of the conveyor belt, an aperture is provided through all the eye parts in each chain link. By overlapping the eye parts including the apertures in a rear side of one chain link with the eye parts and apertures of an adjacent chain link's front edge, a through going aperture across the width of the conveyor belt is achieved. A pin is thereafter inserted through all the apertures whereby the two chain links become coupled in a hinge like manner.

In the food producing industry and especially in slaughterhouses and abattoirs the hygienic requirements are very strict in order not to contaminate the fresh meat being produced in such places. It is, therefore, necessary that a high degree of cleaning of the conveyor belt is achieved. In order to facilitate this the eye parts and pin members of the conveyor belt are exposed in such a manner that they can be cleaned with high pressure water, steam or the like.

In other applications the conveyor belt is partly disassembled and lowered into chemical rinsing baths, for example over night, in order to assure that no contamination from bacterial growth in the chain link will cause contamination of the meat to be processed on the conveyor belt.

In order to be able to cut the meat directly on the conveyor belt, the top surface of each chain link has a certain size in the transport direction such that a level and stable work surface is provided. In order for this surface to be sufficiently strong in order to withstand the extra force exerted on the surface due to the working of the meat, a supporting ridge is sometimes provided on the underside for supporting the conveyor belt on the conveyor construction.

Some of the problems with the prior art conveyor belts as discussed above is the fact that in the conveyor belt's width direction the conveyor belt is made up of a number of independent chain links. Between each chain link there will be a gap wherein cut off meat particles and other substances will be able to accumulate. Furthermore, these gaps between the independent chain links are also difficult to rinse in that they usually are very narrow, which makes it difficult for high pressure water jets to flush everything away in that the high pressure source has to be directed perfectly parallel to the slit in order to be able to penetrate the slit and achieve a cleaning action of said slit.

Another disadvantage with the assembly of the conveyor belt from a number of chain links in the width direction is that a number of chain link end sections are comprised in such a conveyor belt. When a part of an animal to be butchered is transported from one conveyor belt onto another conveyor belt, the meat lump will often fall from one conveyor belt to the next conveyor belt. During this fall, on impact with the lower lying conveyor belt it will exert a comparatively high force on to the lower lying conveyor belt. Often the first point of impact for such a lump of meat will be a corner of one of the many chain links. Due to the relatively fragile construction of the free corners of the chain links, these will often break off. These loose plastic chips afterwards present the danger of ending up in the finished meat product, and furthermore the damage of the chain link needs to be repaired. The same problem can arise due to the working process of the butchers working along the conveyor belt in that during their work routines they might accidentally hit the conveyor belt with a tool such that a corner breaks off.

Furthermore, as the butchers cut the meat directly on the belt, the knives can get stuck in the gaps between the chain links. This gives rise to two main problems. The knife can be pulled out of the hand of the butcher, and due to the resilient nature of the blade it might loosen itself from the belt and fly off with the risk of injuring someone. Alternatively, when the knife becomes stuck in the gap a part of it might break off thereby give rise to the danger that the part ends up in the finished products. If it is detected, the conveyor belt and thereby the entire production must be stopped while the knife or part of the blade is recovered.

OBJECT OF THE INVENTION

The invention sets out to alleviate these and other disadvantages by providing a conveyor belt of the type discussed above, which is special in that the belt in a direction perpendicular to the traveling direction of the belt is made from one single chain link, and that the transport top surface comprises a wide main portion and the top part of the eye projections which are flush with the main portion, such that the belt surface is substantially without apertures and/or openings and further that the hinge-like assembly arrangement is fully accessible only from the underside of the belt.

By this inventive chain link is achieved that the narrow gaps between each assembled chain link in the prior art is not present such that from a hygienic point of view it becomes much easier to clean the entire conveyor belt satisfactory in that for each chain link, which usually constitutes 40–60 mm of the total length of the conveyor belt, which altogether, especially for deboning lines, might be 300–400 meter long, no gaps are present This in turn gives the added security that the multitude of gaps, and for the example mentioned above it would be more than 30,000 gaps, does not have to be cleaned. This gives rise to a substantial increase in the confidence that a satisfactory cleaning process complying with the high hygienic standards in the meat producing business can be achieved.

The chain links being used for the conveyor belts of the type mentioned above are usually made from an injection-molded plastic material. During the molding process and especially the hardening and cooling phase, the plastic material will have a tendency to shrink between 2 and 3%.

The apertures produced in the eye parts is made by inserting a steel pin prior to injecting the moldable material into the injection mould.

After the injected material has begun to harden, the pins are withdrawn whereby the apertures in the eye parts are formed. At the same time, however, the plastic material due to the chemical composition, will give rise to the shrinkage stated above.

When the pin is being withdrawn, the eye parts will tend to shrink around the pin, whereby a rather large force is needed in order to withdraw the pin. A further shrinkage and influence of the pins arises from the fact that the main portion of the chain link between the eye parts on the front and rear edges of each chain link also shrinks 2 to 3%. This again causes increased tension on the pins, especially from the outer edges of the apertures.

It has, therefore, in the art been an accepted compromise that in order to be able to produce the chain links in an economically safe way, i.e. with injection mould of a size resulting in that the shrinkage only will have a minimum effect on the production process, and then on the other hand assemble the rather wide conveyor belt from a number of chain links as discussed above.

The invention, however, in order to alleviate the disadvantages as discussed above with reference to cleaning procedures and hygienic standards as well as the breaking off of corners which may also contaminate the meat products the inventor has developed an injection mould which takes into account the shrinkage of the plastic material such that before removing the pins the apertures and thereby the eye parts on the front and rear edges are brought together corresponding to the 2% shrinkage, whereby the tension on the pins arising from forming the apertures in the eye part is substantially lessened such that it is possible to manufacture chain links with a substantial width.

This also makes it possible in a further preferred embodiment to produce a conveyor belt wherein the distance between the front and rear edges is substantially larger than the projecting eye parts extends in the conveyors traveling direction and that on the underside of each chain link is configured a support ridge arranged centrally and extending substantially across the entire width of the chain link.

Hereby is achieved that the effective working surface is enlarged such that a more stable working surface for the people working along the conveyor belt is provided. This in turn results in better working conditions and a more safe and stable cutting surface and thereby minimizes the risk of damaging both the meat and the workers.

In a further advantageous embodiment of the invention the underside of the chain link slopes away from the base of the ridge, such that the link's material thickness is greater in the middle of the link than along the front and rear edges. In this manner it is assured that liquids and water, which may assemble on the underside of the chain link during the transport of the chain links on their return trip, will drain from the chain links such that also during the production time in the slaughterhouse a higher degree of hygiene is achieved.

By further shaping the eye parts such that the eye parts are wider in the conveyor belts transverse direction at the top surface and tapers towards the under surface, it is achieved that it becomes easier to flush out pieces of meat or other debris which have accumulated around the eye parts and the pin connecting two adjacent chain links.

This configuration also creates bigger openings which again improves the cleaning action in that more water can be forced through the larger openings between the superposed eye parts.

These openings occur when the chain links in the conveyor belt change direction due to the change in path way, for example when the chain link has to perform its return travel at the underside of the conveyor structure.

Usually, the conveyor belt is strung out between two driving wheels, where the power from the motor is imparted into the conveyor belt which thereby is brought into motion. When the conveyor belt turns around the wheels, each chain link will change orientation in relation to a neighboring chain link and thereby the openings around the eye parts will be provided.

In a still further preferred embodiment a configuration having along the front and rear edges the eye parts has a width perpendicular to the traveling direction smaller than the adjacent recess, and furthermore that the upper side of the eye parts is flush with the upper side of the chain links main portion, a larger effective conveyor belt working area is provided.

In this manner it is provided that the eye parts will fit in the recess provided in an adjacent chain link between two eye parts. Furthermore, by having the top part of the eye part flush with the working surface of the conveyor belt, the assembly of two chain links will provide an effective working area in stead of a connection area with substantially different surface conditions than when the top parts of the eye parts are flush with the working surface.

In order to further provide a stable working surface and a strong chain link the height i.e. the distance between the over side of the chain link and the under side of the ridge, respectively the underside of the eye parts is constant. In this manner the chain link is supported at three distinct points along its extension in the intended travel direction of the conveyor belt.

In view of the injection mould process discussed briefly above, it has been found that advantageous embodiments of the invention are achieved when each link has a width perpendicular to the traveling direction which is between 400 mm and 800 mm, preferably between 500 mm and 700 mm, and most preferably 600 mm, and the thickness of each link perpendicular to the surface is between 4 mm and 28 mm, preferably 7 mm to 20 mm and most preferred 12 mm to 17 mm.

In this manner quite large chain links are provided which by themselves or by arranging another similar conveyor belt alongside can provide conveyor belts with a width corresponding to the requirements in the slaughterhouse with a minimum number of chain links and thereby a minimum number of assembly gaps such that the hygienic standard can easily and more securely be obtained.

Also, in view of the injection molding process and the flexibility of the resulting conveyor belt, it has been found advantageous that between 30 and 40 eye protrusions and the same number of recesses are provided for the 600 mm wide links and that between 20 and 28 eye protrusions and the same number of recesses are provided for the 400 mm wide links and further that between 40 and 60 eye protrusions and the same number of recesses are provided for the 800 mm wide links.

This aspect shall be seen in relation to the forces arising on the pin members which are withdrawn during the injection molding process. As the plastic hardens and cools a shrinkage of about 2–3% as mentioned above will occur in the plastic material and thereby increased tension will be created on the aperture forming pins. With the number of eye parts and therefore number of apertures formed as disclosed in this preferred embodiment an advantageous compromise between the injection molding process and the flexibility and effective top working surface of the resulting conveyor belt is achieved.

Also for the same reasons, i.e. due to the injection molding process, the shrinkage and the desire to provide a large effective working top surface on the conveyor belt it has been found advantageous that the distance in the traveling direction of the conveyor belt, between the apertures in the eye parts in the front edge and the rear edge is between 20 mm and 200 mm more preferably between 30 mm and 175 mm, still more preferred between 40 mm and 125 mm, and most preferred 45 mm to 100 mm.

With chain links within these ranges it has been found that a stable and large top surface is provided for transporting and working the meat and at the same time the diameter of the turning wheels can be kept at a relatively small size and furthermore that the number of hinge assemblies where hygienic and cleaning problems can arise is kept at a minimum.

A chain link for constructing a conveyor belt as set out above is also described. This chain link is special in that the link is manufactured as a single piece in a plastic molding process, preferably injection molding, and further that it has a substantially flush top surface, and that eye parts are arranged along to opposite edges said eye parts top surface being flush with the top surface of the chain link, and that eye parts along one edge are staggered relative to eye parts along the opposite edge, and that the width of recesses formed between adjacent eye parts, at least in the top surfaces plane, substantially corresponds to the width of adjacent eye parts.

Also, the chain link in a further advantageous embodiment is made with a higher point on the top surface. From this high point the top surface can slope down to the front and rear edges of the respective link. The height difference between the high point and the edge should only be a matter of millimeters corresponding to 1–2° or just enough to drain the top surface of the chain link.

In a further advantageous embodiment the cleaning of the conveyor belt is facilitated in that means are provided whereby the connection pin can be pushed back and/or forth in a direction perpendicular to the intended traveling direction of the conveyor belt. By this arrangement it is possible to move the pin back and forth such that pieces or other food items which has become stuck in the space provided for play between the pin and the apertures is loosened and can easily and reliably be removed during the cleaning process. These means for pushing the pin back and forth can have different configurations.

In order to further improve the cleaning of the conveyor belt comprising a number of identical chain links, the pin connecting adjacent chain links is longer than the width of the chain links perpendicular to the belt's intended traveling direction such that an end part of the pin projects beyond the side edge of the chain link. In this configuration it becomes possible to manipulate the connection pin, for example by turning it or pushing it back and forth in order to loosen stuck pieces of for example meat which may either contaminate the products placed on the top surface of the belt or give rise to bacteria growth which again will contaminate meat or other perishable goods placed on the conveyor.

In a further advantageous embodiment at least one abutment member is provided along the path the conveyor belt follows on its return passage such that said at least one abutment member will push the projecting end of the connecting pin flush with the side edge of the chain link. In this manner, the abutment member will push the connection pin such that residue or pieces of meat and the like will be loosened if such has become stuck between the apertures in the chain links and the connection pin.

In a further advantageous embodiment the at least one abutment member is arranged before or in a cleaning station suitable for cleaning the chain links, for example by water jets, steam jets or the like as they pass the cleaning station on the conveyor belt's return passage. Especially in embodiments where more than one abutment member is arranged such that an abutment member is arranged on either side of the conveyor belt, the pins will be pushed first to one side and thereafter to the other side, which together with the cleaning arrangement will automatically provide a thorough and effective cleaning of the area around and inside the apertures provided in the chain links as well as the connection pin.

In order to further improve the cleaning process a still further embodiment of the invention provides that a vibration unit is brought into contact with the connection pins. The vibrations transmitted to the pin and secondly to the conveyor belt will cause foreign objects, which could otherwise contaminate the conveyor belt, to become unstuck which together with the cleaning process, for example flushing with water, will effectively clean the entire conveyor belt structure.

In a further advantageous embodiment the vibration unit is integral with the abutment member, for example such that when the pin engages the abutment sliding surface, the vibration will, due to the oblique character of the sliding surface, have a different effect and thereby a variation in the amount of vibration transmitted to the foreign objects being stuck in the belt structure which will have an increased effectiveness.

In a further alternative embodiment wheels or rollers are provided for engagement with the connection pin during the return passage of the conveyor belt wheels or rollers pivotable about an axis parallel to the conveyor belt's intended traveling direction are provided such that the wheels or rollers will engage the pin and push it in a direction perpendicular to the conveyor belt's intended traveling direction. The wheels or rollers will, when engaging the pin, cause the pin to be pushed a little bit to one side relative to the intended traveling direction of the conveyor belt. Thus the same goal as described above will be achieved in that the movement will expose foreign objects being stuck in the pin or aperture.

In a further advantageous embodiment the same movement is provided by providing angled surfaces in the wheels propelling the entire conveyor belt structure. Usually, these wheels engage the underside of the conveyor belt, for example in the area around the pins. By providing them with an angled surface, they will slightly push the connection pin to one side. By furthermore providing the opposite drive wheel with angled surfaces in the opposite direction, the pins will be brought back into the original position. Furthermore, by the loose structure and the dynamics and nature of a conveyor belt of this type, even though the pins are only brought in one direction they will be repositioned due to the further movement of the conveyor belt itself.

In this still further alternative advantageous embodiment of the invention, drive wheels are provided which engage the conveyor belt's underside and propels the belt in the traveling direction, for example by gear wheels or the like engaging the underside of the belt such that in order to push the connection pin in a direction perpendicular to the conveyor belt's intended traveling direction at least one drive wheel is provided with an angled engagement surface or at least some of the teeth of a gear wheel are provided with angled engagement surfaces relative to the pin.

The invention will now be described in more detail with reference to the accompanying drawing. It should, however, be noted that the description of a preferred embodiment does not limit the scope of the invention which is to be limited only by the appended claims.

BRIEF DESCRIPTION OF THE DRAWINGS

FIG. 1 illustrates a conveyor belt built up of a number of chain links as illustrated in the prior art, FIG. 2 illustrates a conveyor belt according to the invention, FIG. 3 illustrates a cross-section through a chain link for use in the conveyor belt according to the invention, FIG. 4 illustrates the edge of a chain link for use in the conveyor belt according to the invention, FIG. 5 illustrates a plane view of the chain link according to the invention.

DESCRIPTION OF A PREFERRED EMBODIMENT

Figure 6:
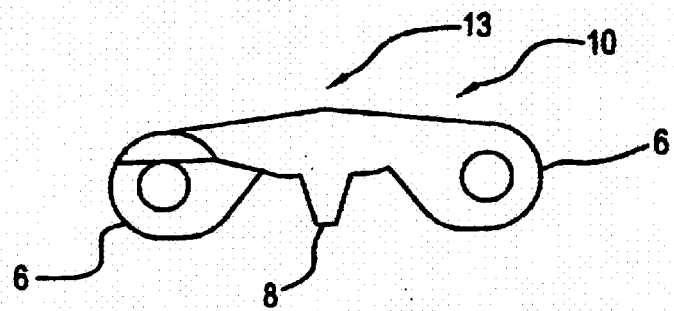
FIG. 6 illustrates another embodiment corresponding to FIG. 3.

FIG. 1 illustrates a traditional conveyor belt having the width necessary for handling fresh food products such as meat, carcasses and the like. The conveyor 1 is constructed from a number of chain links 2, 3. Most of the chain links 2 are identical, but in order to achieve a stronger structure of the conveyor belt there is inserted odd chain links 3, whereby the chain links will be staggered in relation to chain links in an adjacent row such that a brick pattern will arise. The conveyor belt 1 illustrated in FIG. 1 only serves to illustrate how a prior art conveyor belt of the type which the present invention concerns is traditionally constructed. It should be noted that normally at least six or seven chain links are assembled in order to provide the desired width of the conveyor. This in turn gives rise to a number of gaps 4 between adjacent chain links in the same row.

As work often will take place on the top surface of the chain link it is unavoidable that debris such as small pieces of meat, fat bone and the like will be lodged in these gaps. In order to avoid contamination of other food stuff being transported on the conveyor belt, the conveyor belts are thoroughly cleaned at regular intervals in order to provide the necessary high level of hygiene when handling fresh food stuff. This can for example by done by dissembling the conveyor belt and inserting the chain links into chemical baths over night or with high pressure cleaning with water or steam.

In FIG. 2 is illustrated a conveyor belt according to the invention built up of a number of chain links 5. As illustrated only one chain link is used in order to provide the desired width of the conveyor belt. Hereby is achieved that the gaps 4 with reference to FIG. 1 are avoided and thereby the cleaning procedure can be performed with a higher certainty for obtaining the desired result.

In FIG. 3 a cross section through a chain link as illustrated in FIG. 5 according to the invention is illustrated. As can be seen the eye parts 6 at both the front edge and rear edge of the chain link are equipped with apertures 7. In the middle of the chain link on the underside is arranged a ridge 8 such that the top surface of the chain link is supported in three distinct points, namely the lowermost points of the eye part 6 and the lowermost part of the ridge 8. In this manner a stable and firm working top surface is provided on the conveyor belt.

Furthermore, as indicated the material thickness from the base of the ridge 8 towards the eye parts 6 decreases such that a slope 9 is provided. As the chain links making up the conveyor belt are transported back towards the beginning of the conveyor belt, this takes place in an upside-down position. By providing the slope 9 it will be possible to drain off any water and debris which might have come to rest on the underside of the conveyor belt.

Furthermore, as illustrated in FIG. 4 the eye parts 6 at the top section 11 has a width substantially corresponding to the width of the neighboring recess 12. Furthermore, the top section of the eye part is flush with the top surface 10 (see FIG. 2) of the chain link, whereby the assembled conveyor belt will have a substantially flush working surface covering the entire conveyor belt surface. The eye part 6 as illustrated in FIG. 4 furthermore tapers towards the underside of the chain link such that when the chain link is being turned around the drive wheels at the end of the conveyor belt construction, openings will be provided between each chain link due to the tapered configuration of the eye parts. Hereby it becomes possible to drain off the water, debris and other foreign objects that might have been caught at the underside of the chain link through the openings provided due to the taper of the eye parts.

In FIG. 6 is illustrated a cross-section through a chain link according to the invention. In this embodiment the top surface 10 is provided with a higher point 13 from which the top surface slopes downwards towards the eye parts 6. In this manner by providing a slightly sloping top surface, water or other liquids will drain off the top surface. The slope shall be 1–5° which does not influence the top surface as a working surface. Also, the bottommost points of the eye parts 6 are at the same level as the bottommost point of the ridge 8 in order to provide a steady support for the chain link.

Figure 7:
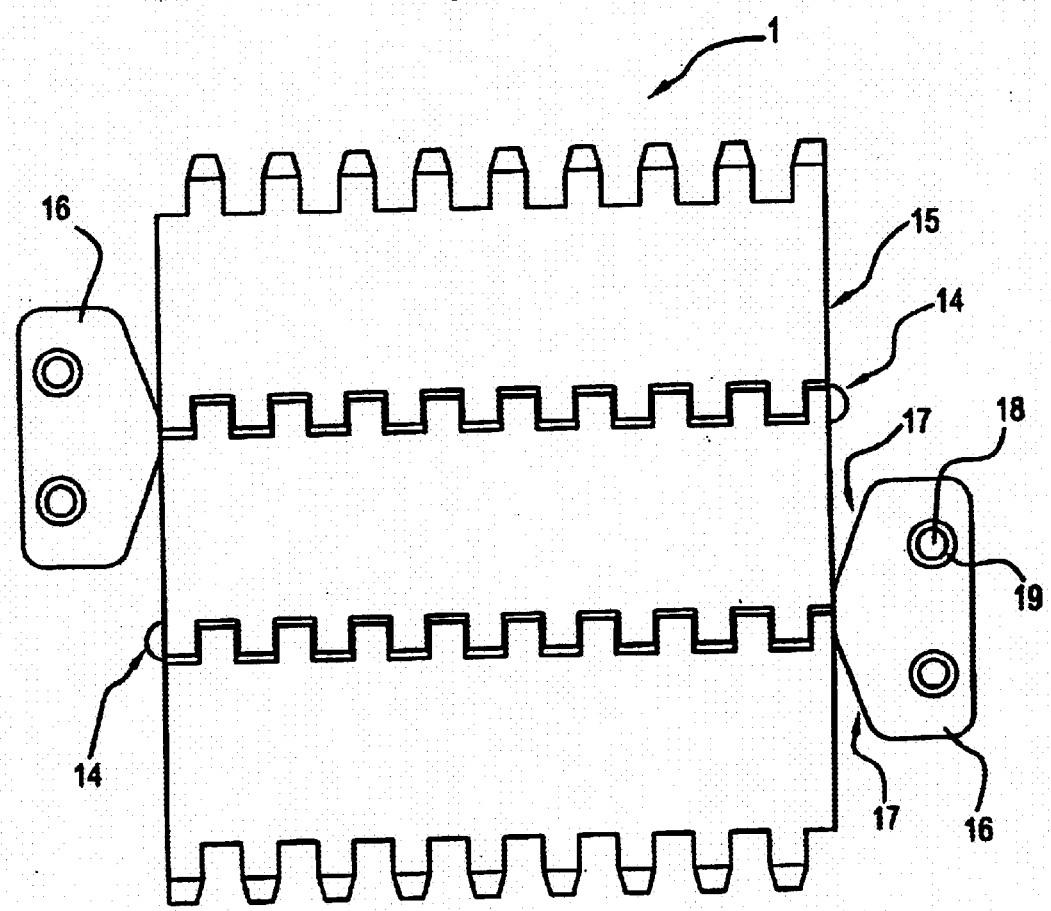
FIG. 7 illustrates the arrangement of two abutment members.

In FIG. 7 the conveyor belt 1 according to the invention is illustrated. The connection pin in this embodiment is longer than the width of the chain links such that an end part 14 of the connection pin projects from the side edge 15 of the chain links. As the belt travels along its conveying path, the protrusions 14 will come into contact with abutment members 16. During the contact with the abutment member the protrusion 14 will be pushed flush with the side edge 15 of the chain link and thereby a lateral movement perpendicular to the intended traveling direction of the conveyor belt will be achieved. During this movement residue stuck between the connection pin and the apertures provided in the eye parts of the belt (see above) will become loose. By arranging a further abutment member at the opposite side, the protrusion 14 at this other side will be forced to be flush with the opposite side edge of the chain link, whereby the movement will be reversed.

The abutment member 16 can be provided with oblique contact surface part 17 which will smoothen the lateral movement of the connection pin once the protruding part of the connection pin 14 comes into contact with the abutment member 16 sliding along the oblique surface 17.

Integral with the abutment member 16 may be provided a vibration unit. The vibration unit can for example be in the shape of an eccentric axle 18 around which is mounted a rubber member 19. By causing the eccentric axis 18 to rotate, vibrations will be created which will be transferred via the rubber member 19 to the abutment surfaces 17 and thereby when the abutment member 16 engages the protrusion 14, the vibrations will be transmitted to the pin and thereby shake any material which is stuck onto the pin or any apertures in the conveyor belt 1 loose. Alternatively, a separate vibration unit can be brought into contact with the conveyor belt.

In embodiments of the invention where connecting pins have a length shorter or equal to the width of the conveyor belt 1 the movement of the pin perpendicular to the intended traveling direction of the conveyor belt 1 can be created, for example by arranging rollers having an axis of rotation parallel to the intended traveling direction of the conveyor belt such that the rollers or wheels will engage the pins between the eye parts. By arranging two sets of rollers having a relative distance in the intended traveling direction of the conveyor belt and opposite directions of rotation, the pins can be brought back and forth perpendicular to the intended traveling direction, whereby any material which has become stuck between the pins and the apertures provided in the eye parts will be loosened.

Similarly, the drive wheels used for propelling the conveyor belt can be equipped with angled surfaces such that when the drive wheels engage the underside of the conveyor belt 1 they will slightly push the pin to one side or the other. In this manner the movement of the pin perpendicular to the intended traveling direction of the conveyor belt will likewise be achieved. Any of the above mentioned examples of creating a movement of the pin perpendicular to the intended traveling direction are for illustration purposes only and, furthermore, any of the embodiments providing for this movement can be further equipped with a vibrating unit such that the loosening effect of material stuck either on the pin or in the apertures provided for the pin in the eye parts can be shaken loose.

By using the chain links according to the invention and thereby avoiding having to assemble a number of chain links in order to provide the width necessary for constructing a conveyor belt, an improved hygiene and cleaning certainty can be assured. Furthermore, when damage is caused to the chain links, for example as described above when an corner is broken off or deeps cuts for one reasons or the other occurs into the chain link during the working process, it is much simpler to replace one or more chain links according to the invention by simply taking one pin member out and replacing one chain link with a new chain link in comparison to having to assemble a number of chain links and guiding the pin through this number of chain links which during the process might move in relation to each other. So on top of being able to easier and thereby cheaper attain a better hygiene for the entire conveyor belt, it is also cost saving when having to conduct repairs to the conveyor belt.

It should be noted that in preferred embodiments of the invention the chain links are produced having substantially standard widths of for example 400, 600 and 800 mm such that these in the event that wider conveyor belts are desired can be built up by arranging two parallel conveyor belts using the inventive chain links according to the invention. In this manner a substantial number of gaps 4 are omitted, whereby the resulting conveyor belt has built in a substantially smaller number of sources for contamination.

What is claimed is:

1. Conveyor belt especially for use in fresh food production industry, assembled from a number of substantially identical chain links thereby forming an endless conveyor belt, each link having a transport top surface and underside, a front and rear edge each comprising integral eye projections and corresponding recesses, arranged such that a protrusion on the front edge corresponds to a recess on the rear edge, and opposing side edges, such that adjacent links are assembled in a hinge-like manner by inserting a connection pin, which pin may comprise one or more pieces such that the pin is inserted through overlapping apertures formed in overlapping eye parts on adjacent chain links such that said belt will be able to carry items on the top surface in the intended traveling direction and that said top surface will be facing downwards during the return passage, wherein the belt in a direction perpendicular to the traveling direction of the belt is made from one single chain link, and that the transport top surface comprises a wide main portion and the top part of the eye projections which are flush with the main portion, such that the belt surface is substantially without apertures and/or openings and further that the hinge-like assembly arrangement is fully accessible only from the underside of the belt, wherein the underside of the chain link slopes away from the base of the ridge, such that the links' material thickness is greater in a middle of the link than along front and rear edges.

2. Conveyor belt according to claim 1, wherein the distance between the front and rear edges is substantially larger than the projecting eye parts extends in the conveyors traveling direction and that on the underside of each chain link is configured a support ridge arranged centrally and extending substantially across the entire width of the chain link.

3. Conveyor belt according to claim 1, wherein the links have a width of about 800 mm, and wherein between 40 and 60 eye protrusions and an equal number of recesses are provided for the 800 mm wide links.

4. Conveyor belt according to claim 1, wherein the eye parts are wider in the conveyor belts transverse direction at the top surface and tapers towards the under surface.

5. Conveyor belt according to claim 1, wherein along the front and rear edges the eye parts has a width perpendicular to the traveling direction smaller than the adjacent recess, and furthermore that the upper side of the eye parts is flush with the upper side of the chain links main portion.

6. Conveyor belt according to claim 1, wherein the height i.e. the distance between the over side of the chain link and the under side of the ridge, respectively the underside of the eye parts is constant.

7. Conveyor belt according to claim 1, wherein each link has a width perpendicular to the traveling direction which is between 400 mm and 800 mm.

8. Conveyor belt according to claim 1, wherein the links have a width of about 400 mm, and wherein between 20 and 28 eye protrusions and an equal number or recesses are provided for the 400 mm wide links.

9. Conveyor belt according to claim 1, wherein the distance in the traveling direction of the conveyor belt, between the apertures in the eye parts in the front edge and the rear edge is between 20 mm and 200 mm.

10. Chain link for use in a conveyor belt according to claim 1, wherein the link is manufactured as a single piece in a plastic molding process, preferably injection molding, and further that it has a substantially flush top surface, and that eye parts are arranged along to opposite edges said eye parts top surface being flush with the top surface of the chain link, and that eye parts along one edge are staggered relative to eye parts along the opposite edge, and that the width of recesses formed between adjacent eye parts, at least in the top surfaces plane, substantially corresponds to the width of adjacent eye parts.

11. Conveyor belt according to claim 1, wherein the links have a width of about 600 mm, and wherein between 30 and 40 eye protrusions and equal number of recesses are provided for the 600 mm wide links.

12. Conveyor belt according to claim 1, wherein the pin connecting adjacent chain links is longer than the width of the chain links perpendicular to the belts' intended traveling direction, such that an end part of the pin projects beyond the side edge of the chain link.

13. Conveyor belt according to claim 7, wherein each link has width perpendicular to the traveling direction between 500 mm and 700 mm.

14. Conveyor belt according to claim 13, wherein each link has a width perpendicular to the traveling direction of about 600 mm.

15. Conveyor belt according to claim 1, wherein a thickness of each link perpendicular to the surface is between 4 mm and 28 mm.

16. Conveyor belt according to claim 15, wherein the thickness of each link is between 7 mm and 20 mm.

17. Conveyor belt according to claim 16, wherein the thickness of each link between 12 mm to 17 mm.

18. Conveyor belt according to claim 9, wherein the distance between the apertures in the eye parts in the front edge and the rear edge is between 30 mm and 175 mm.

19. Conveyor belt according to claim 9, wherein the distance between the apertures in the eye parts in the front edge and the rear edge is between 40 mm and 125 mm.

20. Conveyor belt according to claim 9, wherein the distance between the apertures in the eye parts in the front edge and the rear edge is between 45 mm to 100 mm.

21. Conveyor belt especially for use in fresh food production industry, assembled from a number of substantially identical chain links thereby forming an endless conveyor belt, each link having a transport top surface, and underside, a front and rear edge each comprising intergral eye projections and corresponding recesses, arranged such that a protrusion on the front edge corresponds to a recess on the rear edge, and opposing side edges, such that adjacent links are assembled in a hinge-like manner by inserting a connection pin, which pin may comprise one or more pieces such that the pin is inserted through overlapping apertures formed in overlapping eye parts on adjacent chain links such that said belt will be able to carry items on the top surface in the intended traveling direction and that said top surface will be facing downwards during the return passage, wherein the belt in a direction perpendicular to the traveling direction of the belt is made from one single chain link, and that the transport top surface comprises a wide main portion and the top part of the eye projections which are flush with the main portion, such that the belt surface is substantially without apertures and/or openings and further that the hinge-like assembly arrangement is fully accessible only from the underside of the belt, wherein means are provided whereby the connection pin can be pushed back and/or forth in a direction perpendicular to the intended traveling direction of the conveyor belt.

22. Conveyor belt according to claim 21, wherein at least one abutment member is provided along the path the conveyor belt follows on its return passage, such that said at least one abutment will push the projecting end of the connection pin flush with the side edge of the chain link.

23. Conveyor belt according to claim 22, wherein a vibration unit is intergral with the abutment member.

24. Conveyor belt according to claim 21, wherein for engagement with the connection pin during the return passage of the conveyor belt wheels or rollers pivotable about an axis parallel to the conveyor belt's intended traveling direction are provided such that the wheels or rollers will engage the pin and push it in a direction perpendicular to the conveyor belt's intended traveling direction.

25. Conveyor belt according in claim 21, wherein drive wheels are provided which engage the conveyor belt's underside and propels the belt in the traveling direction by engaging the underside of the belt such that in order to push the connection pin in a direction perpendicular to the conveyor belt's intended traveling direction at least one drive wheel is provided with an angled engagement surface or at least some of the teeth of a gear wheel are provided with angled engagement surface relative to the pin.

26. Conveyor belt according to claim 25, wherein the drive wheels are gear wheels.

27. Conveyor belt especially for use in fresh food production industry, assembled from a number of substantially identical chain links thereby forming an endless conveyor belt, each link having a transport top surface, and underside, a front and rear edge each comprising integral eye projections and corresponding recesses, arranged such that a protrusion on the front edge corresponds to a recess on the rear edge, and opposing side edges, such that adjacent links are assembled in a hinge-like manner by inserting a connection pin, which pin may comprise one or more pieces such that the pin is inserted through overlapping apertures formed in overlapping eye parts on adjacent chain links such that said belt will be able to carry items on the top surface in the intended traveling direction and that said top surface will be facing downwards during the return passage, wherein the belt in a direction perpendicular to the traveling direction of the belt is made from one single chain link, and that the transport top surface comprises a wide main portion and the top part of the eye projections which are flush with the main portion, such that the belt surface is substantially without apertures and/or openings and further that the hinge-link assembly arrangement is fully accessible only from the underside of the belt, wherein the pin connecting adjacent chain link is longer that width of the chain links perpendicular to the belts intended traveling direction, such that an end part of the pin projects beyond the side edge of the chain link, wherein the at least one abutment member is arranged before or in a cleaning station, suitable for cleaning the chain links as they pass the cleaning station on the conveyor belts return passage.

28. Conveyor belt according to claim 27, wherein the cleaning the chain links is by water jets or by steam jets.

29. Conveyor belt especially for use in fresh food production industry, assembled from a number of substantially identical chain links thereby forming an endless conveyor belt, each link having a transport top surface, and underside, a front and rear edge each comprising integral eye projections and corresponding recesses, arranged such that a protrusion on the front edge corresponds to a recess on the rear edge, and opposing side edges, such that adjacent links are assembled in a hinge-like manner by inserting a connection pin, which pin may comprise one or more pieces such that the pin is inserted through overlapping apertures formed in overlapping eye parts on adjacent chain links such that said belt will be able to carry items on the top surface in the intended traveling direction and that said top surface will be facing downwards during the return passage, wherein the belt in a direction perpendicular to the traveling direction of the belt is made from one single chain link, and that the transport top surface comprises a wide main portion and the top part of the eye projections which are flush with the main portions, such that the belt surface is substantially without apertures and/or openings and further that the hinge-like assembly arrangement is fully accessible only form the underside of the belt, wherein the pin connecting adjacent chain links is longer than the width of the chain links perpendicular to the belts intended traveling direction, such that an end part of the pin projects beyond the side edge of the chain link, wherein a vibration unit is brought into contact with the connections pins.

\* \* \* \* \*

UNITED STATES PATENT AND TRADEMARK OFFICE
CERTIFICATE OF CORRECTION

PATENT NO.     : 6,758,329 B1
DATED          : July 6, 2004
INVENTOR(S)    : John Haue Damkjaer and Poul Erik Damkjaer It is certified that error appears in the above-identified patent and that said Letters Patent is hereby corrected as shown below:

Column 10,
Line 39, delete "the ridge" and insert -- a support ridge arranged centrally and extending substantially across the entire width of the chain link. --.
Lines 46-48, delete "a support ridge arranged centrally and extending substantially across the entire width of the chain link" and insert -- the ridge. --.

Signed and Sealed this

Sixth Day of June, 2006

JON W. DUDAS
*Director of the United States Patent and Trademark Office*